United States Patent [19]

Nestle

[11] Patent Number: 5,173,307
[45] Date of Patent: Dec. 22, 1992

[54] FOAM-REBONDING MOLD

[75] Inventor: David E. Nestle, Coral, Mich.

[73] Assignee: Herman Miller, Inc., Zeeland, Mich.

[21] Appl. No.: 639,140

[22] Filed: Jan. 9, 1991

[51] Int. Cl.⁵ .............. B28B 1/50; B28B 7/42
[52] U.S. Cl. .................... 425/4 R; 249/134; 264/DIG. 11; 425/86; 425/547; 425/817 R
[58] Field of Search .............. 264/DIG. 11, DIG. 12; 425/4 R, 4 C, 577, DIG. 237, 817 R, 378.1, 547, 86; 261/DIG. 1; 249/141, 134

[56] References Cited

U.S. PATENT DOCUMENTS

| | | | |
|---|---|---|---|
| 2,332,314 | 10/1943 | Haley | 425/86 |
| 2,977,639 | 4/1961 | Barkhuff, Jr. et al. | 264/DIG. 11 |
| 3,055,057 | 9/1962 | Flotron | 425/817 R |
| 3,124,627 | 3/1964 | Hood | 425/4 R |
| 3,156,015 | 11/1964 | Harrison | 425/86 |
| 3,224,039 | 12/1965 | Kracht | 425/86 |
| 3,737,266 | 6/1973 | Yamamoto | 425/141 |
| 4,192,638 | 3/1980 | Lezier et al. | 425/256 |
| 4,206,166 | 6/1980 | Hayashi et al. | 264/126 |
| 4,333,897 | 6/1982 | Hayashi et al. | 264/40.6 |
| 4,372,759 | 2/1983 | Sederquist et al. | 165/111 |
| 4,385,131 | 5/1983 | Fracalossi et al. | 521/55 |
| 4,438,220 | 3/1984 | Fracalossi et al. | 521/55 |
| 4,438,221 | 3/1984 | Fracalossi et al. | 521/55 |
| 4,456,443 | 6/1984 | Rabotski | 425/4 R |
| 4,458,034 | 7/1984 | Fracalossi et al. | 521/107 |
| 4,487,139 | 12/1984 | Warner | 165/111 |
| 4,591,469 | 5/1986 | Buchanan et al. | 264/45.3 |
| 4,781,555 | 11/1988 | Cook | 425/4 R |
| 4,813,859 | 3/1989 | Bullard et al. | 425/4 R |
| 4,818,451 | 4/1989 | Arai et al. | 425/4 R |
| 4,872,827 | 10/1989 | Noda | 425/526 |

*Primary Examiner*—Jay H. Woo
*Assistant Examiner*—Khanh P. Nguyen
*Attorney, Agent, or Firm*—Varnum, Riddering, Schmidt & Howlett

[57] ABSTRACT

This relates to a mold for rebonding polyurethane and like plastic foam to form selected shapes. A typical shape may be a back or a seat member for an article of furniture. The mold is improved in that the bottom mold member, which is particularly designed in accordance with the desired configuration of the shape, has been formed of epoxy which is readily moldable at a low cost. The mold is also improved by providing the base plate of the mold with a ramped floor which facilitates the drainage of condensate from a lower steam chamber. The configuration of the ramped floor allows for quick removal of the condensate and serves to reduce the volume in the steam chamber thereby minimizing pressure build-up in the steam chamber. This results in lower steam pressures being used during the curing process and for a shorter curing operation. The lower steam pressure also avoids leakage of steam and water from the epoxy mold.

8 Claims, 3 Drawing Sheets

FOAM-REBONDING MOLD

BACKGROUND OF THE INVENTION

1. Technical Field

This invention relates to new and useful improvements in the molding of foam materials More specifically, the invention relates to a mold for rebonding foam.

2. Description of the Related Art

Articles of foam have long been used for padding and support in a wide variety of articles of furniture and the foam articles are typically formed by a molding operation. As shown in the U.S. Pat. No. 3,124,627 to Hood (issued Jan. 13, 1961), it is known to produce and cure such articles through the use of a heated mold where the heat is supplied to the mold in the form of steam.

It is also known to recycle polyurethane foam such that the waste foam is ground up and rebonded to create a new foamed article. As shown in U.S. Pat. No. 4,591,469 to Buchanan, et al. (issued May 27, 1986), rebonding of polyurethane foam can be accomplished by shredding and grinding the foam, blending the waste foam with a flexible polyurethane foam-forming formulation and other solid materials. Thereafter, the mixture is subjected to curing in a steam-heated mold.

The molding operations previously known incorporate a mold constructed of highly durable and corrosive resistant material such as aluminum. In addition to the high cost of such materials, these materials are limited in the configurations which may be easily created. Use of materials such as aluminum, rather than materials such as epoxy is dictated by the relative pressure of the steam for curing required for the known mold configurations. With relative high steam pressures in the mold, use of materials such as epoxy can result in leaks of water and steam from the joints and openings of the mold.

SUMMARY OF THE INVENTION

The present invention overcomes many of these problems by forming a portion of the mold of an epoxy resin which allows for a wide variety of complex shapes to be formed at a relatively inexpensive price. Use of epoxy resin within the mold is possible as a result of the configuration of the steam chamber in the foam rebonding mold. This configuration results in decreased steam pressures necessary to accomplish the curing operation thereby creating a less corrosive environment for the mold materials. In addition, the lower steam pressure decreases the likelihood of leaks of the steam and condensed water from the mold itself.

According to the invention, a foam rebonding mold is utilized to create a molded foam article from particles of existing foam which are bonded together in a curing operation utilizing steam. The rebonding mold comprises a mold base plate, a contoured lower mold member carried by the base plate, a steam chamber created by the base plate and mold member, and a forming core. The forming core is cooperative with the lower mold member to define a mold cavity. A condensate drain is incorporated into the steam chamber. In addition, the steam chamber has a bottom wall in the form of a ramp sloping toward the condensate drain for continuously removing condensate from all parts of the steam chamber. The ramp extends the full width of the steam chamber and may have a coated slope. Alternatively, the ramp can slope both widthwise and lengthwise toward the condensate drain.

The steam chamber of the lower mold is supplied with steam through a steam inlet. This inlet is spaced above the condensate drain. The inlet can also be generally aligned with this drain or may be designed to face in opposite directions within the steam chamber. The steam chamber incorporates upstanding passages which extend through the lower mold to allow for steam flow into the mold cavity. The particular configuration of the lower mold permits use of epoxy as the manufacturing material for the lower mold.

The steps of heating and introducing moisture into the particles of foam through a contoured lower mold member by introducing steam uniformly through the upstanding passages in the underside of the mold from within a steam chamber. This method of rebonding is enhanced by rapidly introducing the steam from the bottom of the mold. The excess condensate is removed through the force of gravity and the sloping bottom of the steam chamber. The sloping bottom of the steam chamber is connected to a drain outlet for removal of the condensate. The sloping bottom of the steam chamber also serves to aid in the uniform application of steam to the molded foam article.

Further, according to the invention there is provided a method for forming a chair seat or back rest comprising the steps of providing a mold having a mold cavity with a surface formed of an epoxy resin, blending together particles of flexible foam, a fire-retardant compound and a rebonding composition until the foam particles are coated with the fire retardant compound and rebonding composition, introducing the blended particles into a mold, closing the mold and compressing the particles into the shape of the mold cavity, and thereafter introducing steam into the mold at a low pressure to bond the particles together and to set the particles into a molded shape. Thereafter, the mold is opened and the chair seat or chair back is removed from.

The flexible foam particles are preferably polyurethane foam formed from polyurethane foam reground to a particle size in the range of ⅛" to ¼", preferably ⅛" to ¼" in diameter. The steam is introduced into the mold at a pressure of about 5 to 30 psi, preferably in the range of 15 to 20 psi. The temperature of the steam is generally in a range of 212° to 250°, preferably 225° to 235°, Fahrenheit. Generally, the time for application of the steam is in the range of 15 seconds to 2 minutes, preferably in the range of 30 to 40 seconds.

With the above and other objects in view that will hereinafter appear, the nature of the invention will be more clearly understood by reference to the following detailed description, the appended claims, and the several views illustrated in the accompanying drawings.

BRIEF DESCRIPTION OF DRAWINGS

The invention will now be described in detail with reference to the accompanying drawings wherein.

DESCRIPTION OF PREFERRED EMBODIMENT

Figure 1:
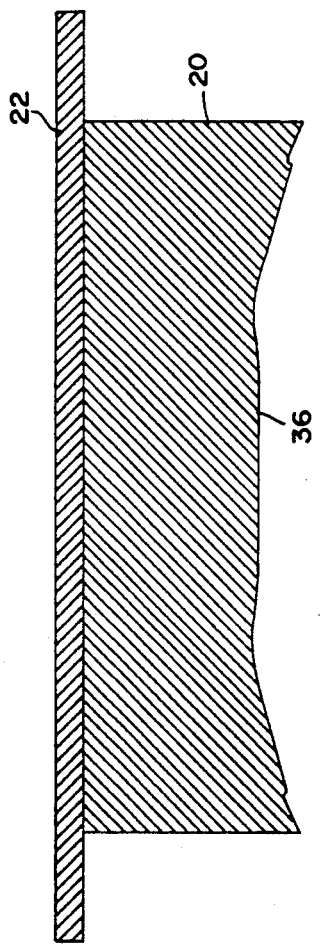
FIG. 1 is a longitudinal sectional view taken through a mold formed in accordance with the invention with the mold being in its open state following the formation of a foamed article.
Figure 1:
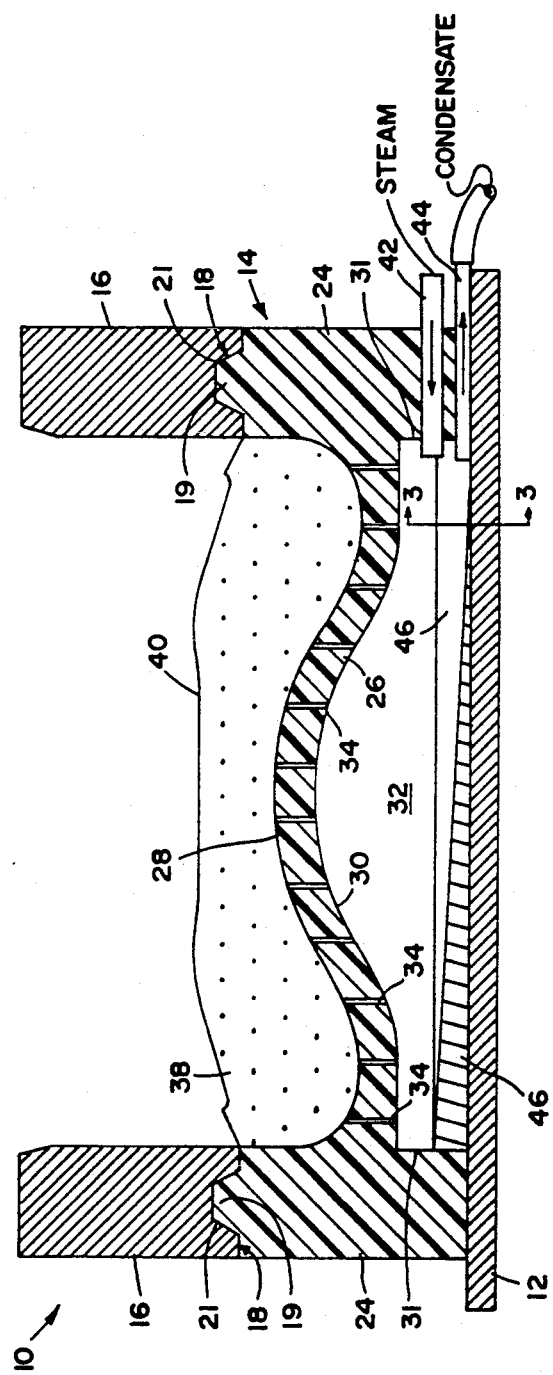

Referring to FIG. 1, a foam rebonding mold is generally identified by the numeral 10. The mold 10 comprises a base plate 12, a bottom mold member 14, an extension 16, a forming core 20 and a second plate 22. The plates should be constructed of a durable, corrosion resistant material such as aluminum. The base plate 12 has seated thereon the bottom mold member 14. Extending upwardly from the top of the mold member 14 is the mold member extension 16 which is interlocked with the mold member by suitable interlocking means 18. In the preferred embodiment, the interlock means 18 comprise an interlocking tongue 19 on the bottom mold 14 and groove 21 on the extension 16. The extension 16 is of a conventional construction and will be normally formed of aluminum or like metal. The forming core 20 is slidable within the mold extension 16 and is supported by the second aluminum plate 22. The core 20 may also be formed of aluminum.

This invention is particularly suited to the formation of the mold member 14 from an epoxy resin. The mold member 14 is substantially concave and defined by a surrounding wall portion 24 and a mold element 26, wherein this mold element 26 extends between the wall portions 24. The mold element 26 has a top surface 28 for obtaining the desired configuration for the article, in the illustrated embodiment, this shape is a chair back cushion. The mold number 14 is made from a wood frame, an aluminium honeycomb and an epoxy/fiberglass layer with an epoxy coating. The inner surface layers of the mold are formed from the epoxy/fiberglass layer and a heat-resistant coating. The wood frame and the aluminum honeycomb form the support for the epoxy/fiberglass layer.

A steam chamber 32 is created beneath the mold element 26. This chamber is defined by an undersurface 30 of the mold member 26, side walls 31 and a ramped floor 46. In order that steam from the steam chamber 32 may pass through the shaped mold element 26, the shaped element 26 is provided at regular intervals with a plurality of small diameter holes 34 which form steam passages. The holes 34 are preferably 1/16" in diameter but the size can be selected to meet the requirements of the foam.

In the illustrated embodiment of the mold 10, the core 20 has an undersurface 36 which is of such configuration to provide the molded foam article 38 with the desired configuration 40.

The mold member 14 is provided with a steam inlet 42 on one side of the mold which opens longitudinally into the steam chamber 32. The steam inlet 42 is preferably in a transversely centered position and allows for the passage of pressurized steam from a suitable source (not shown) to the steam chamber 32.

The mold member 14 also is provided with a drain line 44 which preferably underlies the steam inlet 42 and is longitudinally aligned therewith which allows for removal of condensate which typically occurs during the molding operation.

Figure 3:
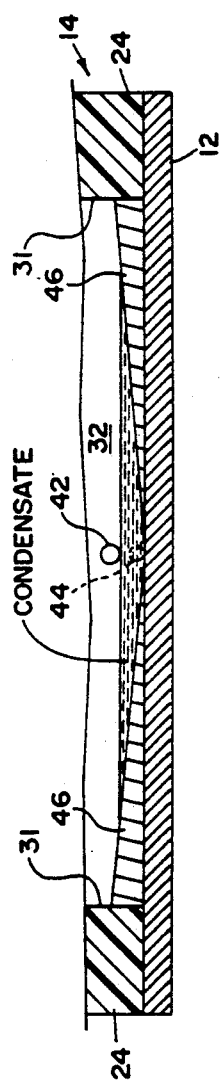
FIG. 3 is a sectional view along lines 3—3 of FIG. 1 showing the slope of the ramped floor transversely to the center drain area.

In order to facilitate the draining of this condensate from the steam chamber 32, the base plate 12 carries the ramped floor configuration 46 which slopes longitudinally, from an opposite side of the mold towards the condensation drain 44. As is shown in FIG. 3, the ramped floor 46 from the transverse side of the mold also slopes transversely towards the center of the ramped floor 46 so as to provide a ramp which slopes both transversely and longitudinally toward the center of the ramped floor 46 in alignment with the condensate drain 44 for effective removal of the condensate. The ramped floor 46 can be coated with moisture-resistant surface such as Teflon.

It will be readily apparent that the condensate within the steam chamber 32, as it collects on the ramped floor 46, will be rapidly urged by gravity due to the slope of the ramped floor 46 toward and out through the condensate drain. This arrangement facilitates drainage of condensation formed during a rebonding process, but also reduces the volume of the steam chamber 32 and reduces the pressure needed to cure the polyurethane foam from which the foamed article 38 is formed.

Molds used previously were formed of highly corrosive resistant materials such as aluminum. However, the configuration of the steam chamber 32 results in a less corrosive environment in light of the lower steam pressure necessary to cure the foam. Therefore, the mold member 14 can be constructed of an epoxy resin. Epoxy resin is less expensive than aluminum and can be formed more easily into more complex shapes. Epoxy resin also has sufficient structural strength to withstand the pressurized environment without leaks of steam or condensate from the mold 10.

Figure 2:
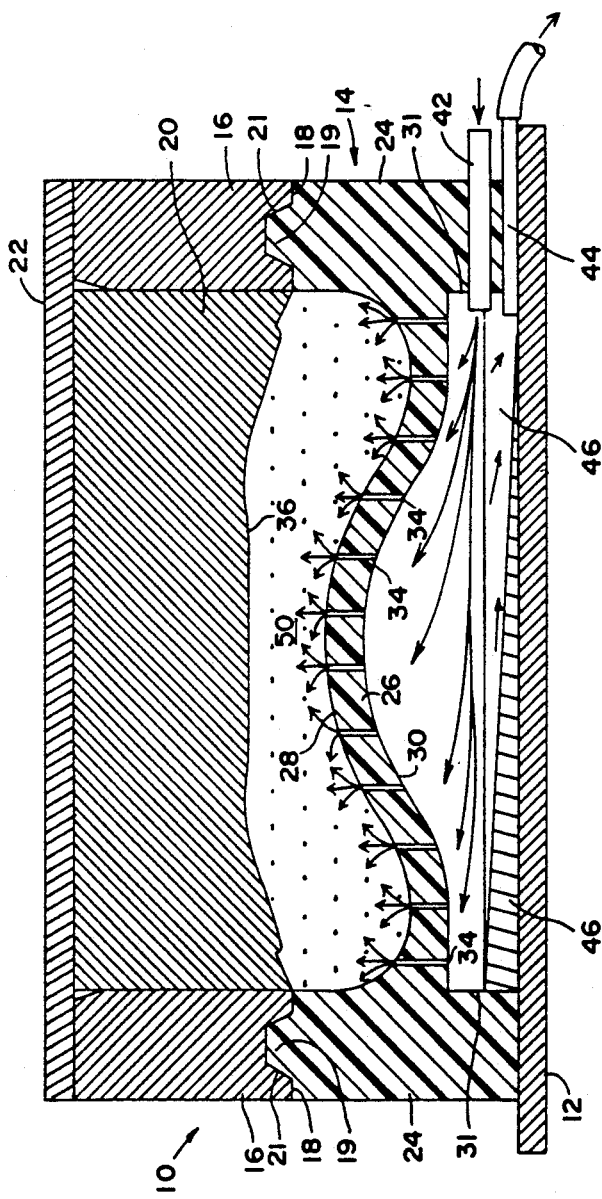
FIG. 2 is a longitudinal sectional view similar to FIG. 1, with the mold in its compressed, curing position.
Figure 4:
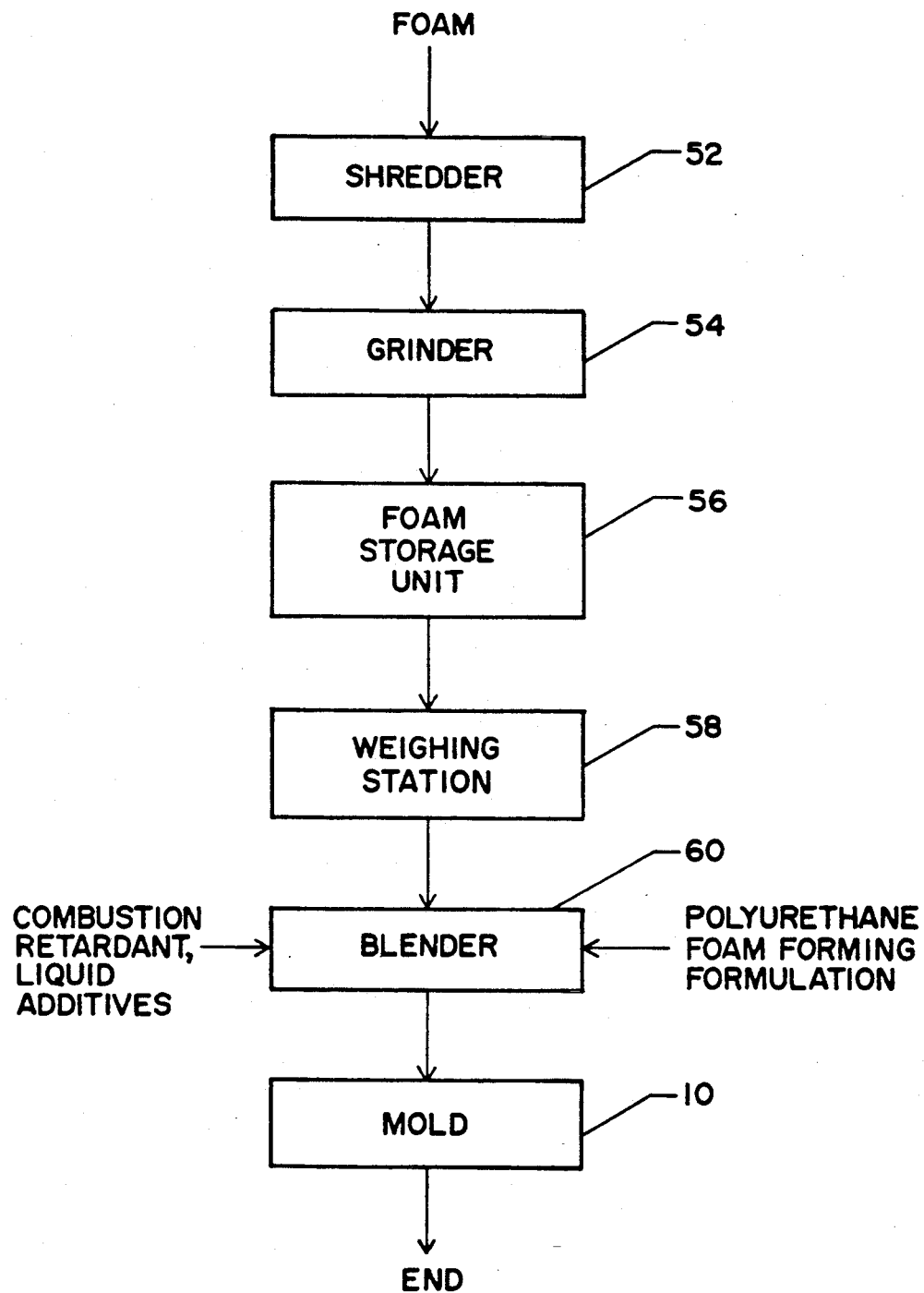
FIG. 4 is a flow chart of the method of forming a rebonded foam article according to the invention.

Referring now to FIGS. 2 and 4, a rebonding operation according to the invention is illustrated. The rebonding operation is similar to that disclosed in U.S. Pat. No. 4,591,469 wherein polyurethane foam is fed to a shredder 52 and then to a grinder 54 to provide a particulate foam having substantially uniform particle size. The particulate size is preferably in the range of $\frac{1}{8}$" to $\frac{1}{4}$", preferably in the range of $\frac{1}{8}$" to $\frac{1}{4}$" in diameter. The particulate foam is fed to a foam storage unit where it may include integral therewith or distinct therefrom a weighing station 58. A weighed amount of the foam is fed from the weighing station 58 into a blender 60. While the foam particles are being rotated within the blender 60, solid materials such as combustion retardant materials and a rebonding formulation are added to the blender. With continuous rotation and blending within the blender 60, the foam particles are uniformly coated to create a uniform mixture 50. Preferably, the prepolymer mix is heated prior to being sprayed onto the foam particles through suitable heater means (not shown). The blended mixture 50 is dispensed from the blender 60 into the mold 10.

After the mixture 50 is introduced into the mold 10, the forming core 20 is forced into the cavity created by the bottom mold 14 and mold extension 16 through suitable press means (not shown). The press means are used not only to position the core 20 relative to the mold member 14, but also to compress the mixture 50 within the mold 10.

As the mixture 50 is compressed within the mold 10, steam is introduced into the steam chamber 32 through inlet 42. The steam enters the mold cavity through the holes 34 and cures the mixture 50 to create the foam article 38. The pressure of the steam is generally at a low pressure, generally in the range of 5 to 30 psi, preferably 15 to 20 psi. The temperature of the steam is generally in the range of 212° to 250° F., preferably 225° to 235° F. The temperature of the steam determines the cure time, and the application of steam is generally sufficient in time to cure the polyurethane-forming reagents, generally in the range of 15 seconds to 90 seconds, preferably in the range of 30 to 40 seconds.

When the rebonding operation is completed, the mold 10 is opened as shown in FIG. 1 and the molded foam article 38 is removed and cooled.

The epoxy resin used for the bottom mold member can be any conventional epoxy resin used for molds. An example of such resin is an RP4005/RP1500H laminating system (Ciba-Geigy) as a lay up resin with fiberglass batting, and an REN RP4026 surface coat (Ciba-Geigy). An alternative epoxy system is a Ciba-Geigy CGL 1320 high-temperature coating used as the base for lay up with a carbon fiber cloth and for the surface coating. The Ciba-Geigy CGL 1320 is a graphite fiber-reinforced surface coat based on high temperature resistant multifunctional epoxy resin.

EXAMPLE

Used rebondable polyurethane foam of approximately 3 lb. molded density was shredded and ground into small particles between ⅛" to ½" in size. The foam particles were added to a blender with conventional fire retardant and rebonding agents. The ingredients were blended until all particles were uniformly coated. The particles were a SR-25 polyurethane sold by STF, Inc., of Baltimore, Md.

The blended particles were placed into molds illustrated in FIGS. 1–3 which molds formed a chair seat and a chair back.

The mold was constructed of an epoxy resin formed by laying up and curing a heat-resistant epoxy laminating system with a fiberglass matting and coating the cured mold with a heat-resistant surface coat. The epoxy laminating system was a Ciba-Geigy epoxy system sold under the trade designation RP4005/RP1500H. The surface coat was a thixotropic, aluminum filled, heat-resistant material sold by Ciba-Geigy under the trade designation REN RP4026. The mold had a smooth surface and was constructed generally as illustrated in FIG. 1.

Two pounds of the blend were placed into the back rest mold and 3.7 pounds of the blend were placed into the seat mold. The mold was then closed. Steam was introduced in the bottom chamber as illustrated in FIG. 1 at a temperature of 225° F. and a pressure of $151 \propto 20$ psig for a time of 15–30 seconds until water began to seep from the parting lines of the mold.

After a delay of 1–1.5 minutes, the molds were opened and the molded chair seat and back rest were removed. The chair seat and back rest had a smooth rounded configuration and appeared suitable for use in a chair construction.

If desired a scrim material can be first placed in the mold cavity formed by top surface 28 and captured between the bottom mold member 14 and the extension 16. The scrim layer will form against the surface 28 and form the outside surface of the final part.

Although only a preferred embodiment of the mold has been specifically illustrated and described herein, it is to be understood that variations may be made in the mold configuration and construction without departing from the spirit and scope of the invention as defined by the appended claims.

The embodiments of the invention in which an exclusive property or privilege is claimed are defined as follows:

1. A foam rebonding mold wherein a molded foam member is formed from particles of existing foam which are bonded together in a curing operation utilizing steam, said mold comprising a mold base plate, a contoured lower mold member carried by said base plate and in combination with said base plate defining a steam chamber, a foaming core cooperative with said lower mold member to define a mold cavity, a steam inlet on one side of said mold for directing steam into said steam chamber, and a condensate drain from said steam chamber, said mold being improved by said steam inlet being adjacent said condensate drain, said base plate having an upper surface defining a bottom wall of said steam chamber and being in the form of a ramp sloping from an opposite side of said mold downwardly towards said steam inlet and condensate drain for continuously removing condensate from all parts of said steam chamber.

2. A foam rebonding mold according to claim 1 wherein said ramp extends the full width of said steam chamber.

3. A foam rebonding mold according to claim 1 wherein said ramp has a coated slope.

4. A foam rebonding mold according to claim 1 wherein said ramp slopes downwardly both widthwise from transverse sides of the mold and lengthwise from said opposite side towards said condensate drain.

5. A foam rebonding mold according to claim 1 wherein said steam inlet is spaced above said condensate drain.

6. A foam rebonding mold according to claim 1 wherein said steam inlet is spaced above said condensate drain and is generally aligned with said condensate drain.

7. A foam rebonding mold according to claim 1 wherein said lower mold has upstanding passages extending therethrough for steam flow.

8. A foam rebonding mold according to claim 1 wherein said lower mold is molded of epoxy.

* * * * *